United States Patent [19]

Kondziola

[11] 4,164,335
[45] Aug. 14, 1979

[54] AUTOMATIC LOCKING RETRACTOR WITH LOCK-UP DELAY

[75] Inventor: Joseph D. Kondziola, Troy, Mich.

[73] Assignee: General Motors Corporation, Detroit, Mich.

[21] Appl. No.: 896,982

[22] Filed: Apr. 17, 1978

[51] Int. Cl.² .................... B65H 75/48; A32B 35/02
[52] U.S. Cl. ............................................. 242/107.4 A
[58] Field of Search ................. 242/107.4 R–107.4 E; 297/388; 280/744–747

[56] References Cited

U.S. PATENT DOCUMENTS

| | | | |
|---|---|---|---|
| 3,667,698 | 6/1972 | Fisher | 242/107.4 D |
| 3,837,594 | 9/1974 | Lewis | 242/107.4 A |
| 3,897,913 | 8/1975 | Hall | 242/107.4 A |
| 3,999,723 | 12/1976 | Magyar | 242/107.4 A |

Primary Examiner—Harvey C. Hornsby
Assistant Examiner—John M. Jillions
Attorney, Agent, or Firm—Charles E. Leahy

[57] ABSTRACT

A seat belt retractor has a belt reel rotatably mounted on a frame and a spring biasing the reel in the belt winding direction of rotation. A pawl is spring biased toward engagement with the reel to lock the reel against belt unwinding rotation. An automatic locking mechanism includes a control disc which is frictionally clutched to the reel for limited rotation therewith and has an abutment moving to a pawl blocking position upon belt unwinding reel rotation. A subsequent belt winding reel rotates the control disc abutment to an unblocking position permitting movement of the pawl toward engagement with the reel. A toggle linkage has a normal extended position which maintains the pawl in a disabled position irrespective of the condition of the control disc. An inertia and attitude sensing pendulum collapses the toggle linkage when the vehicle experiences an inertia condition or attitude change of predetermined magnitude to release the pawl for control by the control disc. A timing element driven by reel rotation restores the toggle linkage to the extended condition whenever the belt is fully wound on the reel and permits collapse of the toggle linkage by the pendulum at any time subsequent to unwinding of the belt from the fully wound condition.

3 Claims, 6 Drawing Figures

AUTOMATIC LOCKING RETRACTOR WITH LOCK-UP DELAY

BACKGROUND OF THE INVENTION

The invention relates to a seat belt retractor of the automatic locking type and more particularly provides mechanism for delaying lock up of the retractor until the vehicle experiences an attitude change or an inertia condition of predetermined magnitude.

Conventional seat belt retractors employed in motor vehicle bodies have a spring biased reel which winds the seat belt to a stored position. The seat occupant may extend the seat belt by unwinding it from the reel and then engage a buckle member on the seat belt with a mating buckle member mounted on the vehicle body to fix the seat belt in a restraining position about the occupant. A locking device is provided which functions to limit unwinding of the belt beyond the extent at which effective restraint of the occupant is provided.

One well known locking device for a seat belt retractor is the so-called inertia locking device wherein the belt may be freely wound and unwound until an inertia sensing member is actuated by an inertia force of a magnitude which is indicative of an unusually high rate of vehicle acceleration or deceleration.

Another well known type of seat belt retractor is the automatic locking retractor. In a retractor of this type, an automatic locking device is employed which prevents locking of the reel while the occupant extends the belt from a fully wound position and then permits a locking pawl to move into engagement with the reel when the belt is retracted. The pawl ratchets over the reel to permit progressive winding of the belt to a snug position about the occupant but will not permit unwinding rotation of the reel.

An advantage of the automatic locking retractor is that the locking function occurs without requiring conscious lock actuating effort on the part of the seat occupant. On the other hand, a disadvantage of the automatic locking retractor is that if the seat occupant inadvertently allows the belt to be retracted somewhat during the process of fixing the belt in its restraining position, the automatic locking device will lock the retractor against further extension. This is particularly frustrating to a seat occupant who is unfamiliar with the operation of an automatic locking retractor and requires that the belt be allowed to fully rewind on the reel before the belt can be again extended.

SUMMARY OF THE INVENTION

An automatic locking seat belt retractor of the present invention features a mechanism for delaying lock up of the retractor by the automatic locking mechanism until such time as the vehicle body experiences an inertia condition of a predetermined modest magnitude which results from an acceleration or rocking or pitching movement or attitude change of the vehicle which is experienced during normal driving manuevers. Accordingly, the automatic locking of the retractor is delayed sufficiently to allow the seat occupant the option of several reversals of winding and unwinding belt movement. This delay allows the seat occupant considerable freedom in manipulating the belt to the restraining position and then adjusting the length of the belt until the occupant finds a comfortable seating position.

A further feature of the invention is that the lock-up delay mechanism coacts with the automatic locking mechanism in such a manner that the affect of the lock-up delay mechanism is cancelled upon the sensing of the first inertia condition subsequent to belt extension so that the reel remains locked against belt unwinding and the lock-up delay mechanism is not reset until the belt is substantially fully rewound on the retractor.

A seat belt retractor according to the invention has a belt reel mounted for rotation relative a frame and a spring biasing the reel in the belt winding direction of rotation. A pawl is spring biased toward engagement with the reel to lock the reel against belt unwinding rotation. An automatic locking mechanism includes a control disc which is frictionally clutched to the reel for limited rotation therewith and has an abutment for controlling movement of the pawl by moving to a blocking position in alignment with the pawl upon belt unwinding reel rotation so as to block movement of the pawl into engagement with the reel. A subsequent belt winding reel rotation moves the abutment to an unblocking position permitting movement of the pawl toward engagement with the reel. A toggle linkage has a normal extended position which maintains the pawl in a disabled position irrespective of the condition of the control disc. An inertia and attitude sensing pendulum collapses the toggle linkage when the vehicle experiences an inertia condition or attitude change of predetermined magnitude to release the pawl for control by the control disc. A timing element driven by the rotation of the reel restores the toggle linkage to the extended condition whenever the belt is fully wound on the reel and permits collapse of the toggle linkage by the pendulum at any time subsequent to unwinding of the belt from the fully wound condition.

BRIEF DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
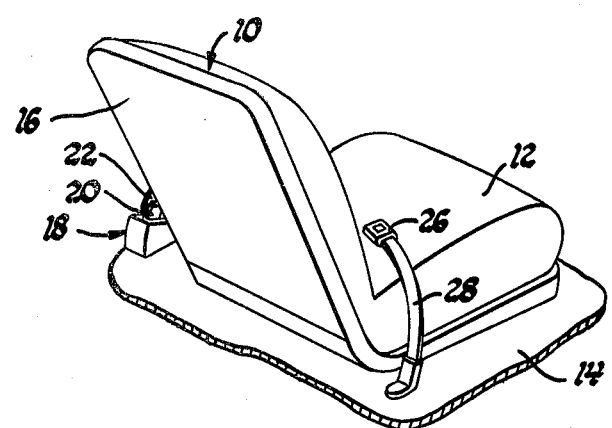
FIG. 1 is a perspective view of the vehicle seat having an occupant restraint belt with a seat belt retractor according to the invention.

Referring to FIG. 1, a vehicle seat indicated generally at 10 includes a seat cushion 12 which is conventionally mounted on the floor 14 of a vehicle body and seat back 16. A seat belt retractor, generally indicated at 18, is attached to the vehicle floor at one side of the seat and mounts a belt 20 having a latch plate 22 attached to its end. The seat belt retractor 18 winds the belt 20 to the stored position of FIG. 1 and permits unwinding of the belt 20 from the reel to a restraining position about the body of a seated occupant. The belt 20 is retained in the occupant restraining position by the engagement of the latch plate 22 with a seat belt buckle 26 which is attached to the vehicle floor 14 by a short length of belt 28.

Figure 2:
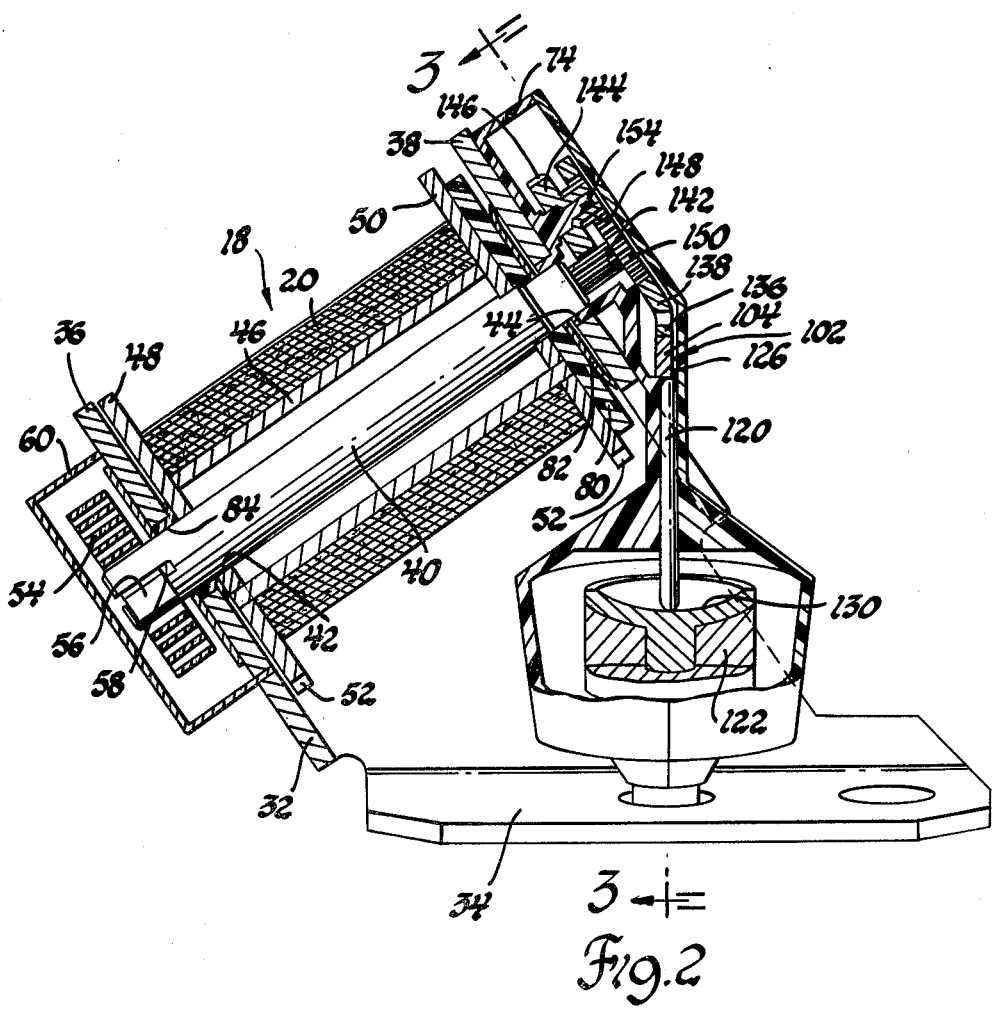
FIG. 2 is a frontal elevation view of a seat belt retractor according to the invention and having parts broken away and in section.
Figure 3:
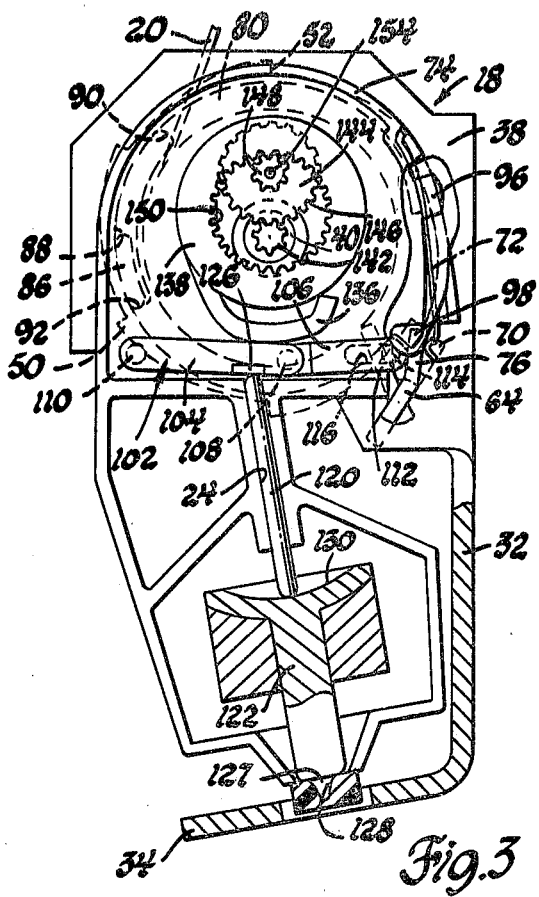
FIG. 3 is a side elevation view of the seat belt retractor of FIG. 2 with the belt fully wound on the reel.

Referring to FIGS. 2 and 3, the seat belt retractor 18 includes a frame 32 having a base 34 which is conventionally bolted to the vehicle floor 14 and laterally spaced upstanding frame walls 36 and 38. A reel shaft 40 has its ends journalled in bores 42 and 44 respectively provided in the frame walls 36 and 38. A pair of ratchet plates 48 and 50 are suitably attached to the reel shaft 40 for rotation therewith and have circumferentially spaced ratchet teeth 52 on their peripheries as best seen in FIG. 3. A belt reel 46 extends between the ratchet plates 48 and 50 and has the seat belt 20 attached thereto.

As best seen in FIG. 2, a spiral spring 54 has an inner end 56 engaged in a slot 58 of the reel shaft 40 and has an outer end, not shown, attached to a spring housing 60 which is attached to the frame wall 36. The spring 54 exerts a bias on the reel shaft 40 which tends to rotate the reel 46 in the direction to wind the belt 20 on the reel 46 to wind the belt between the ratchet plates 48 and 50.

As best seen in FIG. 3, a locking pawl 64 has its ends pivotally mounted in slots provided in the frame walls 36 and 38 of frame 32 and has a tang 70 engageable with the ratchet teeth 52 of the ratchet plate 50. A similar tang, not shown, is engageable with the ratchet teeth 52 of ratchet plate 48.

A leaf spring 72 has an end mounted on a plastic housing 74 attached to frame wall 38 and another end engaging an offset end portion 76 of pawl 64 to urge pivot movement of the pawl toward engagement of its tangs with the ratchet teeth 52 of the ratchet plates 48 and 50.

A control disc 80 is provided for controlling movement of the pawl 64. As best seen in FIG. 2, the control disc 80 is juxtaposed with the ratchet plate 50 and urged into frictional contact therewith by a thrust spring 82 which seats against frame wall 38. A thrust bearing 84 is interposed between the reel shaft 40, the frame wall 36, and the ratchet plate 48 to assure free rotation of the reel 46 irrespective of the bias of the thrust spring 82. It will be understood that the frictional engagement of the control disc 80 with the ratchet plate 50 causes the control disc 80 to rotate with the reel 46.

Figure 4:
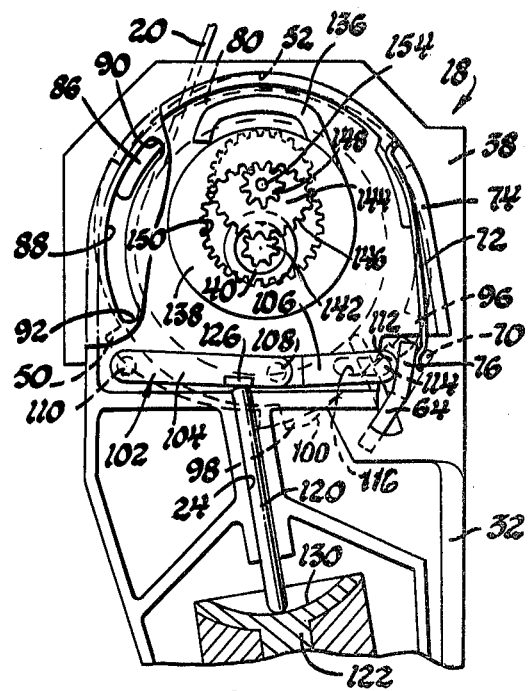
FIG. 4 is a view similar to FIG. 3 but showing the retractor with the belt unwound somewhat from the reel.

The control disc 80 has an axially extending projection 86 which extends into a slot 88 of the frame wall 38. The slot 88 has an end wall 92 which is engaged by the projection 86 as shown in FIG. 3 to limit rotation of the control disc 80 with the reel 46 when the belt 20 is being wound on the reel 46. The slot 88 also has an end wall 90 which is engaged by the projection 86 as shown in FIG. 4 to limit rotation of the control disc 80 with the reel during belt unwinding rotation of the reel.

The control disc 80 also has a pair of radially extending abutments 96 and 98. As seen in FIG. 3, the abutment 98 of the control disc 80 is aligned with the tang 70 of the pawl 64 when winding rotation of the control disc 80 with the reel 46 brings the projection 86 into engagement with the end wall 92 of slot 88. Likewise, as shown in FIG. 4, the abutment 96 is stopped in alignment with the pawl tang 70 when unwinding rotation of the belt 20 rotates the projection 86 into engagement with the end wall 90 of the slot 88. The radial extent of the abutments 96 and 98 is greater than the radial extent of the ratchet teeth 52 of the ratchet plates 48 and 50 so that alignment of either abutment with the pawl tang 70 blocks pivotal movement of the pawl 64 into engagement with the ratchet teeth 52. Furthermore, the radial extent of the abutments 96 and 98 is short of engagement with the pawl 64 when the pawl is held in the disabled position of FIGS. 3, 4 and 5 by the lock-up delay mechanism to be discussed hereinafter. The abutment 98 has an inclined cam surface 100 which may lift the pawl 64 out of ratcheting engagement with the ratchet teeth 52 upon belt winding rotation of the reel 46.

A lock-up delay mechanism for preempting control of the pawl 64 by the control disc 80 includes a toggle linkage generally indicated at 102. As best seen in FIG. 3, the toggle linkage 102 includes a pair of links 104 and 106 having their adjacent ends pivotally joined by a pivot pin 108. The end of link 104 is pivotally mounted on the plastic housing 74 by a pivot pin 110. The toggle link 106 has an end 112 which engages an offset end portion 76 of pawl 64 and carries a laterally extending pin 114 which rides in a guide slot 116 of the plastic housing 74 to define a rectilinear path of movement of the toggle link end 112. Referring to FIG. 3, it is seen that the toggle linkage 102 has a normal extended condition in which the pivot pin 108 joining the links 104 and 106 is slightly overcenter with respect to the pivot pin 110 and the laterally extending pin 114 so that the effort of spring 72 acting on the pawl 64 urges the toggle linkage 102 in the downward direction. The toggle linkage 102 may be collapsed to the position of FIG. 6 wherein the end 112 is withdrawn from support of pawl 64 so that spring 72 may move the pawl toward engagement with the ratchet plates 48 and 50.

Referring again to FIG. 3, it will be seen that a plunger 120 and a pendulum 122 support toggle linkage 102 in its FIG. 3 extended condition for maintaining the pawl 64 out of engagement with both the control disc 80 and the ratchet plates 48 and 50. The plunger 120 is mounted for reciprocating movement within a bore 24 of the plastic housing 74 and has an upper end which engages a lateral offset tab 126 of the toggle link 104. An inverted pendulum 122 has a base 127 which seats in a depression 128 of the plastic housing 74 and has a concave support surface 130 which supports the lower end of plunger 120. The pendulum 122 and plunger 120 cooperate to support the toggle linkage 102 in its FIG. 3 normal extended condition against the bias of the leaf spring 72 and cooperate to collapse the toggle linkage 102 to the FIG. 6 position as will be discussed hereinafter.

Referring to FIG. 3, it will be seen that the toggle linkage 102 is also positioned in its extended condition of FIG. 3 by a finger 136 of a timing gear 138. The finger 136 is yieldable to accommodate variation in dimension of the various parts. The timing gear 138 is connected to the reel shaft 40 through a gear train which includes a pinion gear 142 on the end of the shaft 40 and a spur gear 144 mounted for rotation on an axle portion 154 of the plastic housing 74. The spur gear 144 has gear teeth 146 driven by the pinion 142 and has gear teeth 148 which drive the timing gear 138 through its internal gear teeth 150. The ratio of the intermeshing gear teeth is such that the timing gear 138 will rotate through less than one complete revolution during the several revolutions of the reel as the belt is completely wound or unwound.

OPERATION

Referring to FIG. 3, the seat belt retractor 18 is shown with the belt 20 fully wound on the reel 46. The finger 36 of timing gear 138 establishes the toggle linkage 102 in its FIG. 3 extended position wherein the end 112 of toggle link 106 holds the pawl 64 in its furthest disengaged position out of engagement with both the control disc 80 and the ratchet teeth 52. The plunger 120 and pendulum 122 engage the lateral tab 126 of toggle link 104 to support the toggle linkage 102 against downward collapse from its extended position of FIG. 3.

FIG. 4 shows the seat belt retractor after the belt 20 has been unwound somewhat from the reel 46, as for example to permit the occupant to buckle the belt in the restraining position. As the belt unwinding is initiated from the fully wound condition of FIG. 3, the pinion gear 142 and spur gear 144 rotate the timing gear 138 in the counterclockwise direction to carry the finger 136 thereof away from engagement with the toggle linkage 102. The toggle linkage 102 remains in its overcenter extended position by the bias of the pawl spring 72 acting on the pawl 64 and urging the toggle links 104 and 106 downwardly into engagement with the plunger 120. The unwinding rotation of the reel 46 as the belt is unwound causes the control disc 80 to rotate from its FIG. 3 position wherein projection 86 engages end wall 92 of slot 88 to the FIG. 4 position where the projection 86 engages end wall 90 of the slot 88 so that the abutment 96 is aligned with the pawl tang 70 of pawl 64.

Figure 5:
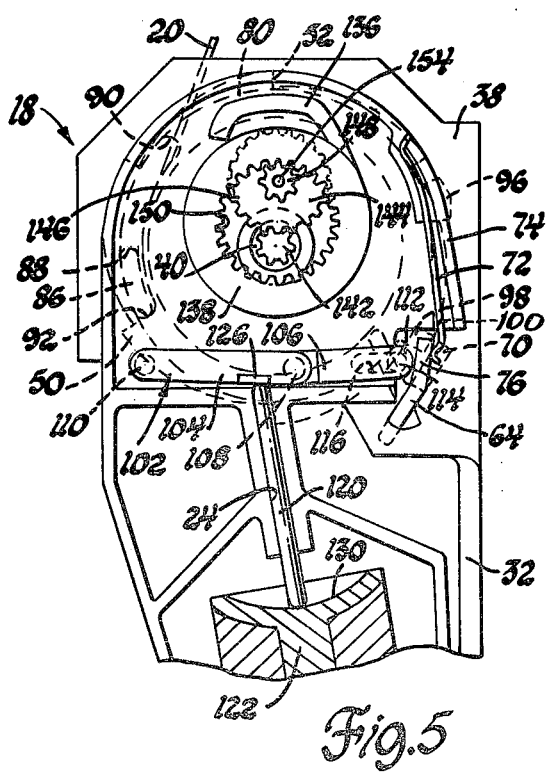
FIG. 5 is a view similar to FIG. 4 but showing a retractor with the belt having been rewound slightly from the position of FIG. 4.

Referring to FIG. 5, the retractor is shown with the belt 20 having been rewound somewhat on the reel 46 from its position of FIG. 4 such as occurs after the belt has been buckled about the occupant and the occupant settles in a comfortable position in the seat 10. Such rewinding of the reel 46 carries the control disc 80 in the counterclockwise direction to engage the projection 86 with the end wall 92 of slot 88 so that the abutment 98 is aligned with the tang 70 of pawl 64. The toggle linkage 102 continues to maintain the pawl 64 out of engagement with the blocking disc 80 and the ratchet teeth 52.

Figure 6:
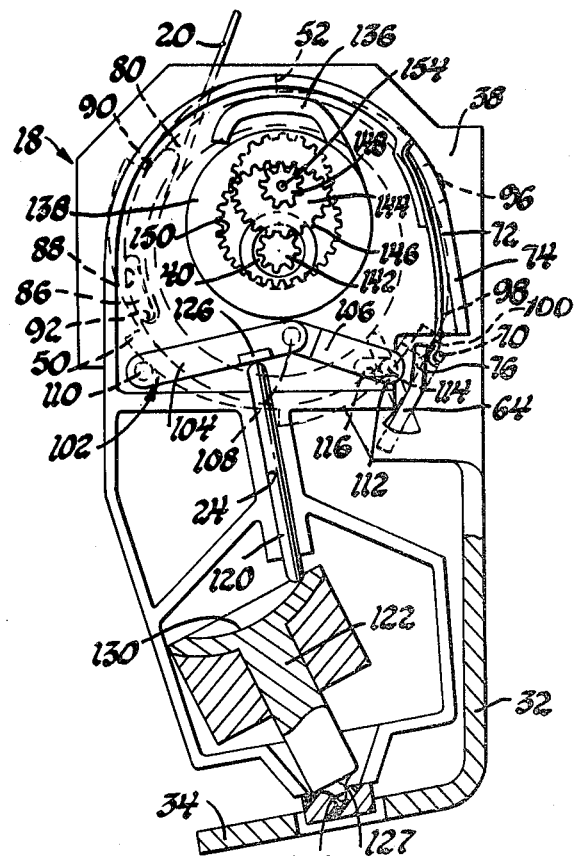
FIG. 6 is a view similar to FIG. 5 but showing the affect of an inertia stimulus on the lock-up delay mechanism of the retractor.

Referring to FIG. 6, the control disc 80 is shown in the position of FIG. 5 wherein the belt has been rewound to align abutment 98 with the pawl tang 70. An acceleration impulse or change in attitude encountered by the vehicle body causes the pendulum 122 to rock to the FIG. 6 position so that the conical support portion 130 of the pendulum lifts the plunger 120 upwardly. The upward movement of the plunger 120 moves the toggle linkage 102 overcenter to the collapsed condition of FIG. 6 permitting the leaf spring 72 to move the pawl into engagement with the aligned abutment 98 of the control disc 80 so that abutment 98 prevents engagement of the pawl tang 70 with the ratchet teeth 52 until the belt is unwound slightly to carry the abutment 98 out of supporting engagement with the pawl 64. If the belt is rewound further from the position of FIG. 6 subsequent to collapse of the toggle linkage 102 by the pendulum, the abutment 98 will be maintained in its position blocking the pawl 64 to prevent a clicking noise which would otherwise result if the pawl 64 were allowed to ride on the ratchet teeth 52 during such belt winding rotation of the reel.

Referring to FIG. 4, it will be understood that collapse of the toggle linkage 102 by the pendulum 122 when the control disc abutment 96 is aligned with the pawl causes the abutment 96 to block engagement of the pawl tang 70 with the ratchet teeth 52. This blocking function of the abutment 96 allows continued belt unwinding rotation of the reel in those instances where an inertia stimulus or attitude change causes the pendulum 122 to prematurely collapse the toggle linkage 102 while the operator is making his first unwinding of the belt for buckling in the restraining position. A subsequent rewinding of the belt will carry the abutment 96 out of engagement with the pawl 64 to allow movement of the pawl 64 to engage the pawl tang 70 with ratchet teeth 52 to block any further unwinding of the belt. A further and continued rewinding of the belt will carry the abutment 98 against the pawl tang 70 so that its inclined cam surface 100 will pivot the pawl 64 out of engagement with the pawl teeth to prevent the clicking noise which would otherwise result from the pawl ratcheting over the ratchet teeth 52. Any subsequent attempted unwinding of the belt will carry the abutment 98 out of supporting engagement with the pawl to return the pawl into engagement with the ratchet teeth 52 to block a subsequent unwinding rotation of the reel.

If the toggle linkage 102 is collapsed by the pendulum while the control disc 80 is in a position intermediate FIGS. 4 and 5, neither of the control disc abutments 96 or 98 will be aligned with the pawl 64 so that the pawl may immediately move into locking engagement with the ratchet teeth 52.

It is an important feature of the invention that the occupant restraining effectiveness of the seat belt retractor is not compromised even though the lock-up delay mechanism may be prematurely actuated by collapse of the toggle linkage prior to the belt being buckled in the restraining position. In this event, the retractor simply reverts to operating on the one-free-pull fashion of a conventional automatic locking retractor and the belt reel is locked automatically against unwinding rotation after some slight rewinding of the belt.

The automatic locking mechanicm and the lock-up delay mechanism are reset by unbuckling the belt and allowing its complete windup so that the timing gear 138 returns to its FIG. 3 position wherein the finger 136 moves the toggle linkage 102 downwardly to its extended position to restore pawl 64 to its furthest disengaged position permitting free rotation of the control disc 80 to its limits of rotation defined by the projection 86 of the control disc 80. As the timing gear 138 restores the toggle linkage 102 to its extended position of FIG. 3, the plunger 120 is urged downwardly and acts on the concave support surface 130 of the pendulum 122 to restore the pendulum 122 to its normal vertical position in readiness for a subsequent donning of the seat belt.

Thus, it is seen that the invention provides an improved automatic locking retractor having a lock-up delay mechanism which delays lock up of the retractor until the vehicle experiences a predetermined acceleration or attitude condition. Accordingly, the seat occupant is given the option of making several reversals of winding and unwinding belt movement so that the belt can be freely manipulated and adjusted until the occupant buckles the belt and finds a comfortable seating position. Furthermore, it will be understood that the lock-up delay mechanism coacts with the automatic locking device in such a manner that the effect of the lock-up delay mechanism is cancelled upon the sensing of the first such condition subsequent to belt extension and that the lock-up delay mechanism is not reset and does not affect functioning of the automatic locking retractor until the belt is substantially fully rewound on the reel.

The embodiments of the invention in which an exclusive property or privilege is claimed are defined as follows:

1. In a vehicle seat belt retractor having a rotatable reel for winding and unwinding a belt, spring means biasing the reel in the belt winding direction, a pawl, ratchet means on the reel engageable by the pawl, said pawl being selectively movable between a position disengaged from the ratchet means to permit belt unwinding and an engaged position locking the belt against belt unwinding rotation, the improvement comprising:

spring means biasing the pawl to the engaged position;

a toggle linkage having an extended position of engagement with the pawl to block engagement of the pawl with the reel and a collapsed position to unblock the pawl for movement to the reel engaging position;

means responsive to rotation of the reel and adapted to establish and maintain the toggle linkage in the extended position when the belt is in a fully wound condition and permit movement of the toggle linkage to the collapsed position when the belt is unwound from the fully wound position;

means responsive to a sensed condition of vehicle acceleration or attitude for moving the toggle linkage to the collapsed position to unblock the pawl for movement to the reel engaging position;

a control disc clutched to the reel for limited rotation therewith and carrying an abutment rotating to a blocking position in alignment with the pawl in response to unwinding rotation of the reel to block movement of the pawl to the engaged position when the responsive means moves the toggle linkage to the collapsed position unblocking the pawl prior to initiation of winding rotation of the reel carrying the control disc abutment to an unblocking position allowing pawl movement to the reel engaging position.

2. In a vehicle seat belt retractor having a rotatable reel for winding and unwinding a belt, spring means biasing the reel in the belt winding direction, a pawl, ratchet means on the reel engageable by the pawl, said pawl being selectively movable between a position disengaged from the ratchet means to permit belt unwinding and an engaged position locking the reel against belt unwinding rotation, the improvement comprising:

spring means biasing the pawl to the engaged position;

a toggle linkage having an extended position of engagement with the pawl to block engagement of the pawl with the reel and a collapsed position overcenter from the extended position to unblock the pawl for movement to the reel engaging position;

means responsive to rotation of the reel and adapted to establish and maintain the toggle linkage in the extended position when the belt is in a fully wound condition and permit movement of the toggle linkage to the collapsed position when the belt is unwound from the fully wound position;

means responsive to a sensed condition of vehicle acceleration or attitude for moving the toggle linkage to the collapsed position to allow movement of the pawl toward the engaged position;

a control disc clutched to the reel for limited rotation therewith and carrying an abutment rotating to a blocking position in alignment with the pawl in response to unwinding rotation of the reel to block movement of the pawl to the engaged position irrespective of movement of the toggle linkage to the collapsed position and rotating to a nonblocking position upon initiation of winding rotation;

winding rotation of the reel and control disc prior to movement of the toggle linkage to the collapsed position being effective to rotate the abutment of the control disc out of alignment with the pawl so that upon subsequent movement of the toggle linkage to the collapsed position the pawl is moved to engagement with the reel to block belt unwinding rotation;

and winding rotation of the reel and control disc subsequent to unwinding reel rotation and subsequent to movement of the toggle linkage to the collapsed position being effective to rotate the abutment of the control disc out of engagement of the pawl to allow movement of the pawl into engagement with the reel to block belt unwinding rotation.

3. In a vehicle seat belt retractor having a rotatable reel for winding and unwinding a belt, spring means biasing the reel in the belt winding direction, a pawl, ratchet means on the reel engageable by the pawl, said pawl being selectively movable between a position disengaged from the ratchet means to permit belt unwinding and an engaged position locking the reel against belt unwinding rotation, the improvement comprising:

spring means biasing the pawl to the engaged position;

a control disc clutched to the reel for limited rotation therewith and carrying an abutment rotating to a blocking position in alignment with the pawl in response to unwinding rotation of the reel to block movement of the pawl to the engaged position during belt unwinding and moving to an unblocking position upon initiation of subsequent belt winding;

a toggle linkage having an extended position of engagement with the pawl to block engagement of the pawl with the reel irrespective of the position of the control disc abutment and a collapsed position overcenter from the extended position to unblock the pawl for movement to the reel engaging position;

means adapted to establish and maintain the toggle linkage in the extended position when the belt is in a fully wound condition and permit overcenter movement of the toggle linkage to the collapsed position when the belt is unwound from the fully wound position;

and a pendulum responsive to a sensed condition of vehicle acceleration or attitude for moving the toggle linkage to the collapsed position to allow movement of the pawl toward the engaged position and initiate control of the pawl by the control disc.

* * * * *